(12) United States Patent
Fujimoto et al.

(10) Patent No.: US 7,453,517 B2
(45) Date of Patent: Nov. 18, 2008

(54) IMAGE SENSOR MODULE

(75) Inventors: Hisayoshi Fujimoto, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 387 days.

(21) Appl. No.: 10/527,274

(22) PCT Filed: Sep. 9, 2003

(86) PCT No.: PCT/JP03/11525

§ 371 (c)(1), (2), (4) Date: Mar. 8, 2005

(87) PCT Pub. No.: WO2004/023794

PCT Pub. Date: Mar. 18, 2004

(65) Prior Publication Data

US 2005/0253951 A1     Nov. 17, 2005

(30) Foreign Application Priority Data

Sep. 9, 2002 (JP) ............................. 2002-262994
Feb. 5, 2003 (JP) ............................. 2003-027945
Aug. 28, 2003 (JP) ............................. 2003-304309

(51) Int. Cl. *H04N 5/225* (2006.01)
(52) U.S. Cl. ............................................ 348/374
(58) Field of Classification Search ........... 348/335, 348/36, 373, 211, 143, 219.1, 341; 382/154, 382/106, 108, 293; 396/354
See application file for complete search history.

(56) References Cited

U.S. PATENT DOCUMENTS

| | | | |
|---|---|---|---|
| 6,177,950 B1 * | 1/2001 | Robb | 348/14.01 |
| 6,226,035 B1 * | 5/2001 | Korein et al. | 348/335 |
| 6,339,214 B1 * | 1/2002 | Takakura et al. | 250/208.1 |
| 6,654,097 B1 * | 11/2003 | Nishi | 355/53 |
| 6,766,112 B2 * | 7/2004 | Kuwata et al. | 396/114 |
| 6,801,343 B1 * | 10/2004 | Sheng | 358/474 |
| 6,806,899 B1 * | 10/2004 | Schaack | 348/65 |
| 6,907,139 B2 * | 6/2005 | Yamamoto | 382/154 |
| 6,930,707 B2 * | 8/2005 | Bates et al. | 348/78 |
| 6,975,358 B1 * | 12/2005 | Morley | 348/335 |
| 7,034,882 B2 * | 4/2006 | Kato et al. | 348/335 |
| 7,071,973 B1 * | 7/2006 | Yoshioka et al. | 348/219.1 |
| 2006/0146169 A1 * | 7/2006 | Segman | 348/335 |

FOREIGN PATENT DOCUMENTS

| | | |
|---|---|---|
| JP | 10-262167 | 9/1998 |
| JP | 2000-515255 | 11/2000 |

(Continued)

*Primary Examiner*—Lin Ye
*Assistant Examiner*—Amy Hsu
(74) *Attorney, Agent, or Firm*—Hamre, Schumann, Mueller & Larson, P.C.

(57) ABSTRACT

An image sensor module A1 includes a case 300, a photoelectric converter 400 positioned within the case 300, and first and second optical units 100, 200 for forming an image of a subject on the light-receiving surface of the photoelectric converter 400. Imaging of the subject using the first optical unit 100, or imaging of the subject using the second optical unit 200, can be selected. It is possible to conduct a plurality of types of imaging each having a different view angle, while restricting increases in size and cost.

19 Claims, 15 Drawing Sheets

FOREIGN PATENT DOCUMENTS

| | | |
|---|---|---|
| JP | 2002-27292 | 1/2002 |
| JP | 2002-320123 | 10/2002 |
| JP | 2003-018437 | 1/2003 |
| JP | 2003-169233 | 6/2003 |
| JP | 2003-298919 | 10/2003 |
| WO | WO 97/49003 | 12/1997 |

* cited by examiner

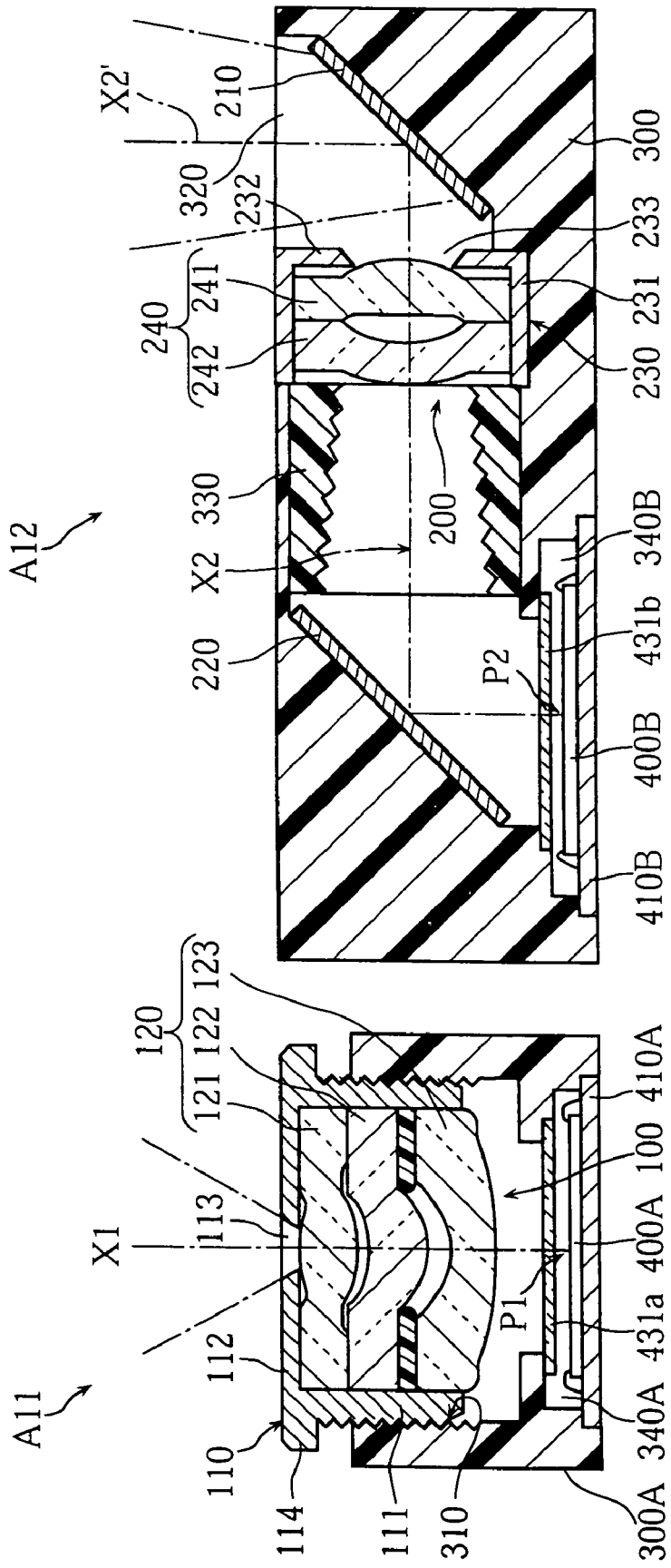

IMAGE SENSOR MODULE

TECHNICAL FIELD

The present invention relates to an image sensor module employed as a component in digital cameras, and mobile phones with cameras and the like.

BACKGROUND ART

An example of this type of image sensor module is disclosed in JP-A 2002-247288. The image sensor module disclosed in this publication comprises an image sensor chip mounted on a substrate, and a case enclosing the image sensor chip on the upper surface of the substrate. The case holds an image-forming lens firmly in place. The image of the subject is formed on the image sensor by the function of the image-forming lens. The image sensor chip outputs an image signal with an output level corresponding to the image of the subject.

However, the conventional technology has only a single optical unit employing an image-forming lens, while the focal distance of the image-forming lens is fixed. The view angle when imaging the subject (the area of the subject which may be obtained as an image through the lens) is fixed and diversity in imaging is limited.

A zoom lens unit (a lens unit having a function to vary the focal length) may be employed as means for changing the view angle. However, a zoom lens unit has a precision mechanism to move a simple lens accurately, and cost is therefore very high. Further, since a zoom lens unit comprises a plurality of simple lenses arranged at appropriate spacing on an optical axis, it becomes large. A zoom lens unit is not appropriate as a component for an image sensor module which requires cost and size reduction.

DISCLOSURE OF THE INVENTION

An object of the present invention is to provide an image sensor module which is capable of resolving or reducing the problems.

According to a first aspect of the present invention, an image sensor module is provided which comprises a case, a photoelectric converter disposed within the case and having a light-receiving surface, a first optical unit provided within the case and forming an image of the subject on the light-receiving surface. The image sensor module further comprises a second optical unit forming the image of the subject on the light-receiving surface of the photoelectric converter provided in the case so that the light path differs from the first optical unit. Switching is possible between imaging of the subject using the first optical unit and imaging of the subject using the second optical unit.

It is desirable that the first and second optical units each have an image-forming lens, and that a light path from the image-forming lens of the second optical unit to a first position where the image of the subject is formed is longer than a light path from the image-forming lens of the first optical unit to a second position where the image of the subject is formed.

Preferably, the first optical unit is employed for standard imaging, whereas the second optical unit is employed for standard imaging with a narrower view angle during imaging than the first optical unit, or for telescopic imaging.

It is desirable that the photoelectric converter comprises an image sensor chip, and that the image sensor chip is movable to the first and second positions.

Preferably, the image sensor module according to the present invention comprises a substrate on which the image sensor chip is mounted, and an operating mechanism for moving the substrate relative to the case to bring the image sensor chip to the first and second positions.

Preferably, the operating mechanism includes a cover attached to the substrate and enclosing the image sensor chip, and a guide provided on the case for slidably guiding the cover.

Preferably, the image sensor module according to the present invention further comprises an optical filter passing only light of specific wavelengths proceeding to the image sensor chip, wherein the filter is movable together with the image sensor chip.

Preferably, the photoelectric converter comprises first and second image sensor chips disposed at the first and second positions, respectively.

Preferably, on-off drive of the first and second image sensor chips is switchable.

Preferably, the first optical unit has an optical axis extending linearly from the image-forming lens to the first position, whereas the second optical unit has a bent optical axis extending from the image-forming lens to the second position.

Preferably, the second optical unit has light-reflecting means for reflecting light an even number of times.

Preferably, the light-reflecting means includes a first light reflecting surface for causing light proceeding in a first direction from a front side of the subject towards the case to be reflected in a second direction intersecting the first direction, and a second light reflecting surface for causing light from the first light receiving surface to be reflected in the first direction towards the second position.

Preferably, the light-reflecting means include a transparent member having a plurality of surfaces, wherein two of the plurality of surfaces serve as the first and second light reflecting surfaces, and wherein the first and second light reflecting surfaces provides total reflection of light proceeding from the subject.

Preferably, the light-reflecting means include a plurality of mirrors.

Preferably, the first and second optical units mutually overlap in the second direction.

Preferably, the second optical unit has fewer lenses than the first optical unit.

Preferably, each of the first and second optical units has a light incident side provided with an aperture, wherein the aperture of the second optical unit has a larger opening than the first optical unit.

Preferably, the image-forming lens of at least one of the first and second optical units is positionally adjustable in the optical axis direction.

Preferably, the second position is closer to the first position than it is to an incident optical axis of the second optical unit.

Preferably, an incident optical axis of the second optical unit is closer to the first position than it is to the second position.

Preferably, the image sensor module according to the present invention further comprises a third optical unit provided in the case and having an optical path different from the optical paths of the first and second optical units for forming an image of the subject on the light-receiving surface of the photoelectric converter, wherein switching to imaging of the subject using the third optical unit is possible in addition to imaging of the subject using the first and second optical units.

Preferably, the photoelectric converter comprises an image sensor chip, and the image sensor is movable to positions where images of the subject are formed in the first through third optical units.

Preferably, the photoelectric converter comprises first through third image sensor chips provided in corresponding relationship to the first through third optical units.

According to a second aspect of the present invention, an image sensor module provided is provided which comprises a case, a substrate mounted at a bottom portion of the case, an image sensor chip mounted on the substrate and having a light-receiving surface directed toward a front side of the case, and an optical unit provided within the case and forming an image of the subject on the light-receiving surface. The optical unit has a first light reflecting surface for causing light proceeding from the front side of the case in the first direction towards the case to be reflected in a second direction intersecting the first direction, and a second light reflecting surface for causing light reflected by the first light reflecting surface to be reflected in the first direction towards the light receiving surface.

Other features and advantages of the present invention will be apparent from the following description of the embodiments of the invention.

BRIEF DESCRIPTION OF THE DRAWINGS

FIG. 16A and FIG. 16B are cross-sectional views showing another embodiment of the image sensor module according to the present invention.

BEST MODE FOR CARRYING OUT THE INVENTION

Figure 1:
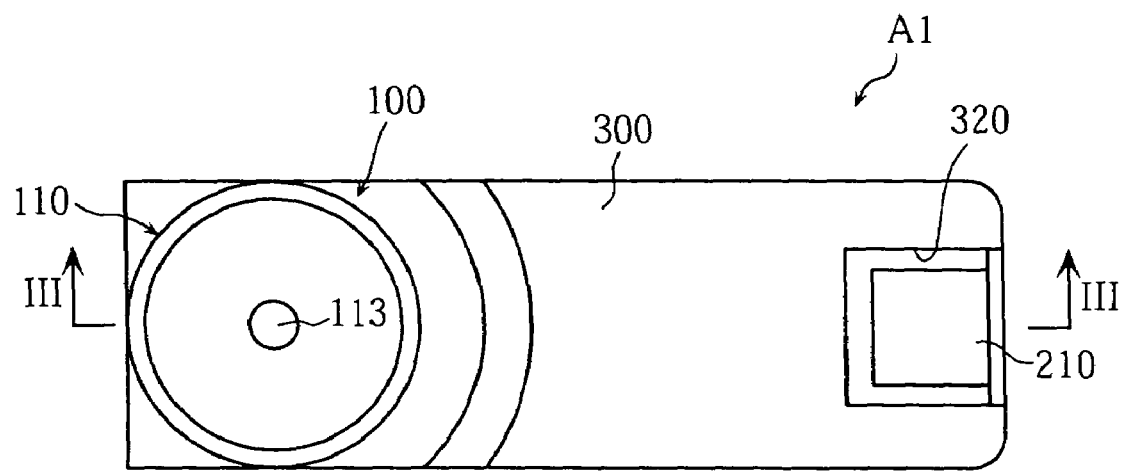
FIG. 1 is a plan view showing an embodiment of the image sensor module according to the present invention.

The desirable embodiments of the present invention are hereunder described detail in reference to the figures.

FIG. 1 through FIG. 4 show embodiments of the image sensor module according to the present invention. As clearly shown in FIG. 3, the image sensor module A1 of the present embodiment is comprised of a case 300, first and second optical units 100 and 200, an image sensor chip 400, and an operating mechanism 420.

The case 300 is of synthetic resin, and is rectangular in shape in plan view. The first optical unit 100 is provided at one end in the longitudinal direction of the case 300, and has an image-forming lens 120. This image-forming lens 120 is a compound lens comprising three simple lenses 121, 122, and 123 stacked together within a cap 110. The simple lenses 121 and 122 are convex lenses, while the simple lens 123 is a concave lens. According to this structure, distortion can be reduced, and achromatization is also possible. The cap 110 has a tubular section 111 and a top wall 112 covering the tubular section 111. An opening 113 is formed in the top wall 112. Light from the exterior of the case 300 is able to reach the image-forming lens 120 only through the opening 113. The top wall 112 is therefore equivalent to an aperture limiting the amount of light incident on the image-forming lens 120 from the exterior. The tubular section 111 is screwed into the threaded hole 310 in the top of the case 300, and thus the cap 110 is fitted to the case 300. However, a flange 114 is further provided on the top of the cap 110, and this flange 114 is used to enable the cap 110 to be rotated. When the cap 110 is rotated, it moves in the direction of the optical axis X1.

Figure 2:
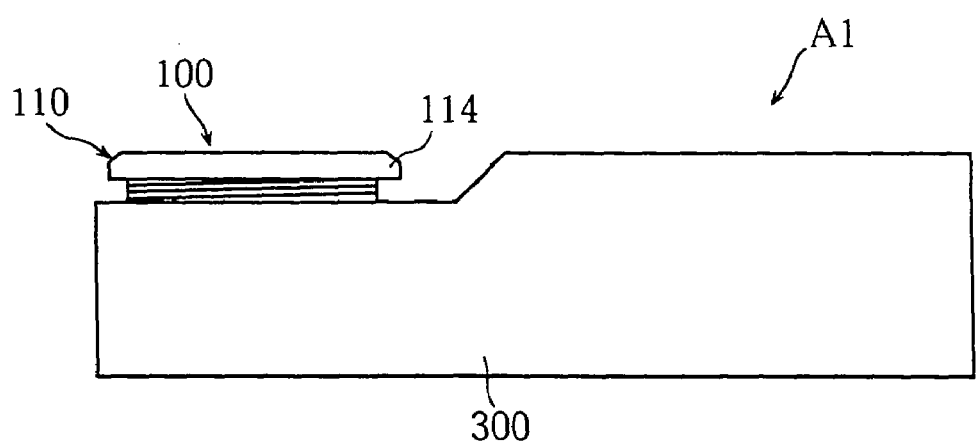
FIG. 2 is a front view of the image sensor module shown in FIG. 1.
Figure 3:
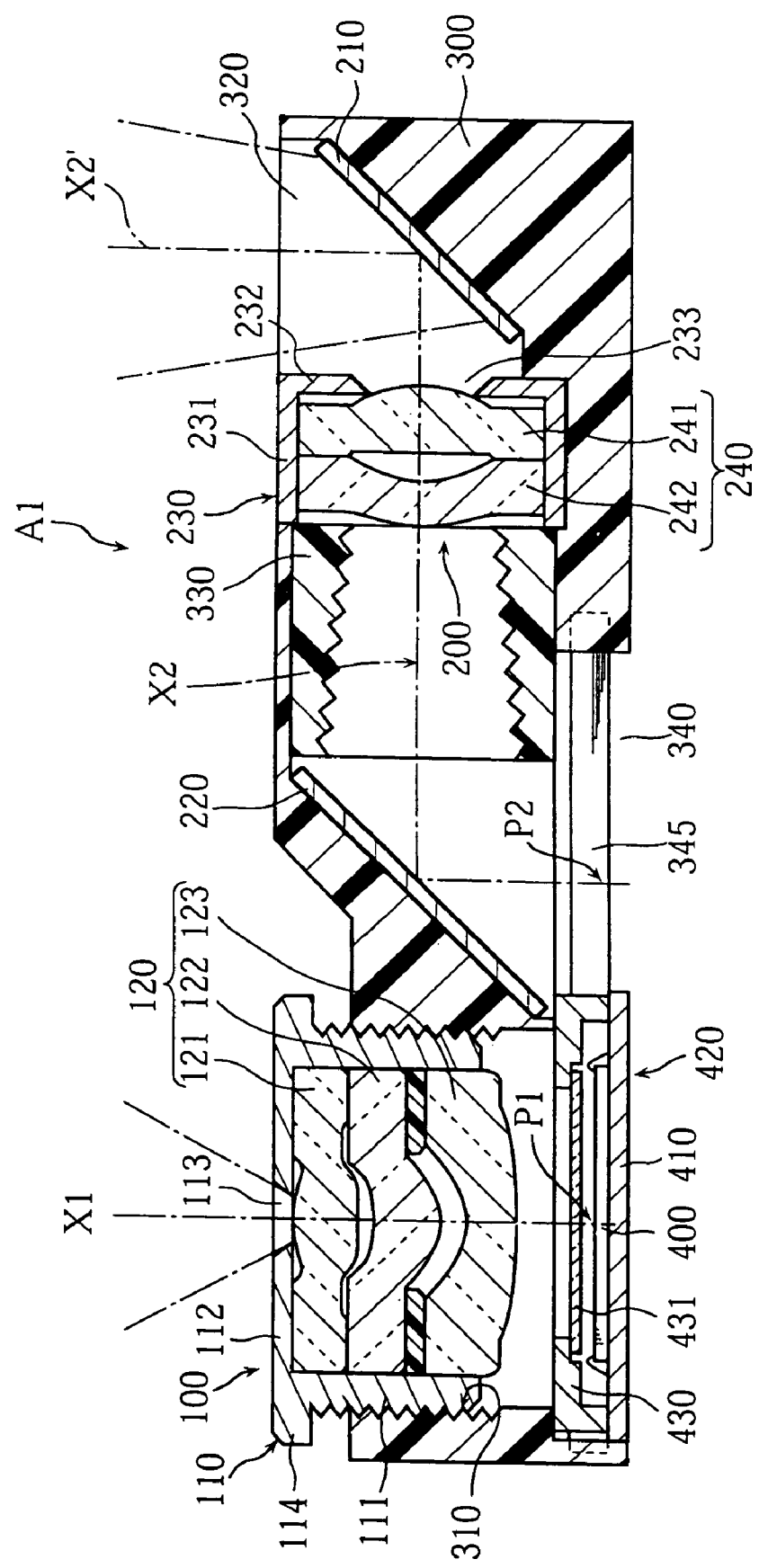
FIG. 3 is an enlarged cross-sectional view along III-III in FIG. 1.

The structure of the first optical unit 100 is such that the optical axis X1 extends in a straight line in the thickness direction of the case 300 (the vertical direction in FIG. 2 and FIG. 3). When this first optical unit 100 is used for imaging the subject, the image sensor chip 400 is positioned at the first position P1 on the optical axis X1 directly below the image-forming lens 120. This first position P1 is the image-formation point of the image of the subject. The first optical unit 100 is used for the standard imaging mode, and the image-forming lens 120 has a focal distance appropriate for this imaging mode.

The second optical unit 200 is provided from approximately the center to the other end of the case 300 in the longitudinal direction. This second optical unit 200 has first and second mirrors 210 and 220, an image-forming lens 240, and a light shield 330.

The first mirror 210 reflects light passing through an opening 320 formed in the top wall of the case 300 at its other end in the longitudinal direction, and proceeding downwards inside the case 300 towards the center of the case 300 in the longitudinal direction, and is incorporated into the case 300 so that it is inclined at 45° to the thickness direction. The second mirror 220 reflects downwards light reflected by the first mirror 210, and is incorporated into the case 300 so that it is inclined at 45° in a similar manner to the first mirror 210. The surfaces of the first and second mirrors 210 and 220 are equivalent to the example of the first and second reflecting surfaces of the present invention. In the second optical unit 200, since the light is reflected by the first and second mirrors 210 and 220, the optical axis X2 is bent. Thus, the light path of the second optical unit 200 inside the case 300 is longer than that of the first optical unit 100. However, the incident optical axis X2' on the second optical axis X2 extends in the same direction as the first optical axis X1. When an image of the subject is formed on the image sensor chip 400 using the second optical unit 200, the image sensor chip 400 is positioned at the second position P2 directly below the second mirror 220 on the optical axis X2. This second position P2 is the image forming point of the image of the subject in the second optical unit 200. The second mirror 220 is provided close to the first optical unit 100. Thus, increase in length of the case 300 in the longitudinal direction is restricted.

The image-forming lens 240 is a compound lens comprising two simple lenses 241 and 242 held within the lens holder 230. The simple lens 241 is a convex lens, and the simple lens 242 is a concave lens. Achromatization is therefore possible in the image-forming lens 240, as with the image-forming lens 120. This image-forming lens 240 is provided closer to the first mirror 210 than to the second mirror 220. Light passing through the image-forming lens 240 therefore proceeds towards the second mirror 220. The lens holder 230 has a tubular section 231 holding the simple lenses 241 and 242, and a side wall 232 contiguous with one end of this tubular section 231, and an opening 233 for entry of light formed in this tubular section 231. The side wall 232 is equivalent to an aperture limiting the amount of light incident on the image-forming lens 240. The diameter of the opening 233 is greater than the diameter of the opening 113 in the cap 110. The second optical unit 200 provides telescopic imaging at a magnification of three in comparison with standard imaging using for example, the first optical unit 100, and the image-forming lens 240 has a longer focal distance than the image-forming lens 120 so that it is appropriate for this imaging mode. The light path from the image from lens 240 to the second position P2 is longer than the light path from the image-forming lens 120 of the first optical unit 100 to the first position P1. On the other hand, the view angle with telescopic imaging is narrower than with standard imaging, and the distortion to be corrected with the telescopic imaging lens is generally less than with standard imaging. In the present embodiment, the total number of simple lenses in the image-forming lens 240 is therefore less than that for the image-forming lens 120.

The light shield 330 is tubular in shape and is provided between the image-forming lens 240 and the second mirror 220. The light shield 330 has a tapered hole wherein the diameter increases as it approaches the second mirror 220, and light passes through this tapered hole. It is desirable that inner peripheral surface of the tapered hole be formed in a concave-convex saw-tooth cross-section. At least the inner surface of this light shield 330 is of a dark color, for example, black and the like. This is achieved painting, or by forming the light shield 330 of a black synthetic resin.

An area CCD chip, or a CMOS area imaging sensor chip, for example, is employed as the image sensor chip 400. A plurality of point light-receiving elements is arranged in a matrix (not shown in figures) on the upper surface of this image sensor chip 400, and configured such that an image signal of a corresponding level is output in a fixed sequence when light falls on each of the light-receiving elements.

Figure 5:
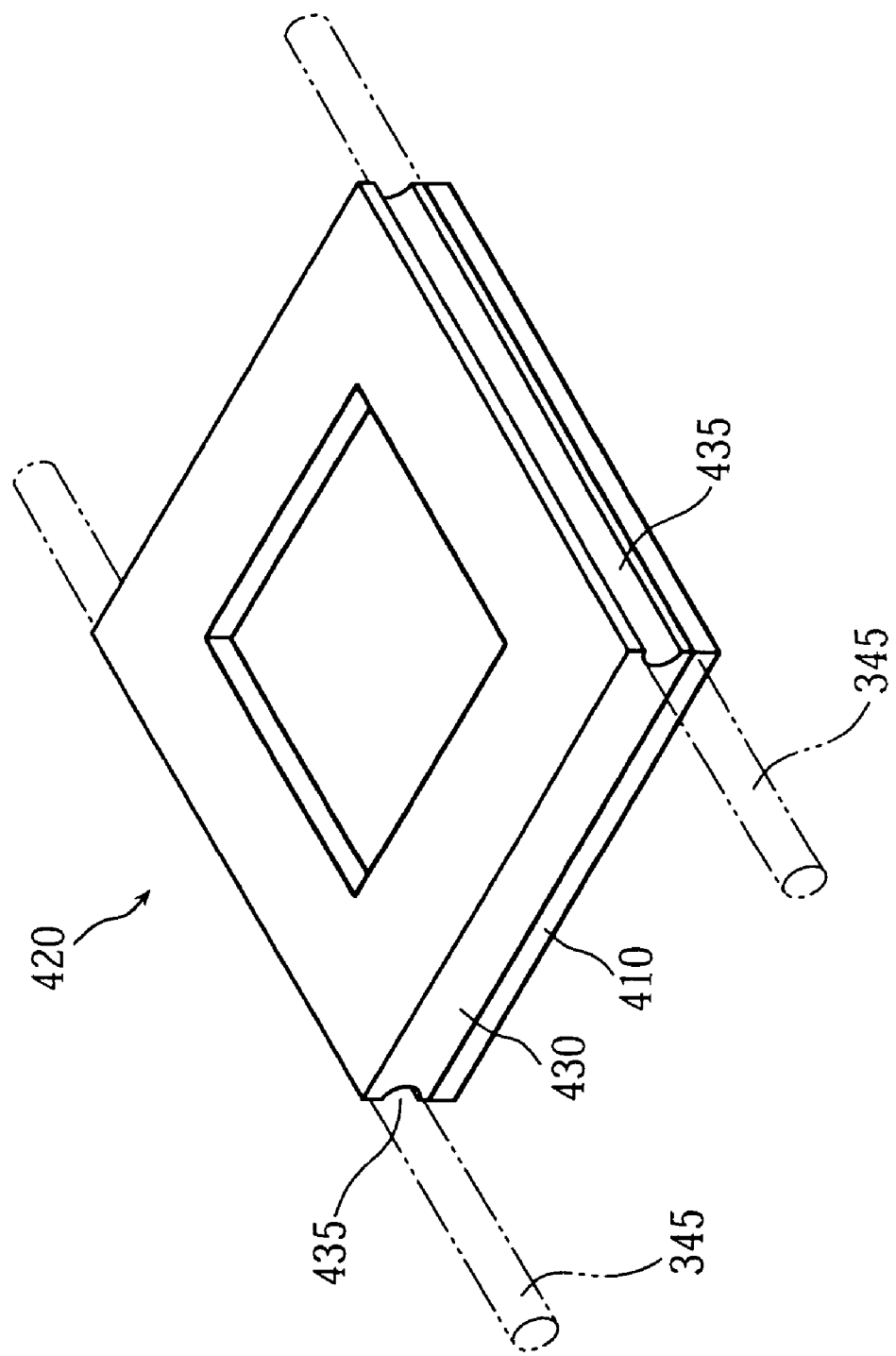
FIG. 5 is a perspective view showing an outline of the structure of the operating mechanism incorporated in the image sensor module shown in FIG. 1.

The operating mechanism 420 is a mechanism to move the image sensor chip 400 selectively to the first and second positions P1 and P2. This operating mechanism 420 has the substrate 410 on which the image sensor chip 400 is mounted, the cover 430 attached on this substrate 410, and a pair of guide rods 345 to guide this cover 430 when sliding. The substrate 410 has a wiring pattern for supply of electric power necessary to drive the image sensor chip 400, and for input and output of signals, and is connected to an external device via wiring (not shown in figures). This wiring is connected to the substrate 410 such that movement of the substrate 410 is not inhibited. The cover 430 covers the vicinity of the image sensor chip 400. An optical filter 431 is fitted to the cover 430. This optical filter 431 functions to prevent entry of light of wavelengths not required by the image sensor chip 400, and to protect the image sensor chip 400 from dust. The pair of guide rods 345 is disposed in the cutaway section 340 in the bottom of the case 300, with both ends in the longitudinal direction supported by the bottom of the case 300, and the case 300 extending in the longitudinal direction. As shown clearly in FIG. 5, this pair of guide rods 345 fits into concave sections 435 formed on both sides of the cover 430. This structure supports the cover 430 on the pair of guide rods 345, and allows it to slide in the longitudinal direction. The image sensor chip 400 is able to reciprocate between the first and second positions P1 and P2 within the cutaway section 340 in association with slide operation of this cover 430.

Sliding of the cover 430 can be realized by, for example, providing a slide lever on a device or equipment incorporating this image sensor module A1, and linking operation of this slide lever to operation of the cover 430. Or, in place of this structure, a structure may be adopted wherein a rack is provided on the cover 430 or the substrate 410, and a pinion meshing with this rack rotated by a motor. Furthermore, a female threaded section may be provided in the cover 430 or substrate 410, and a screw feed mechanism wherein a screw shaft meshing with this female threaded section is rotated by a motor to slide the cover 430.

Operation of the image sensor module A1 will be described below.

As shown in FIG. 3, when the image sensor chip 400 is positioned at the first position P1, the image of the subject is formed on the image sensor chip 400 using the image-forming lens 120. Imaging in this case is in the standard imaging mode.

Figure 4:
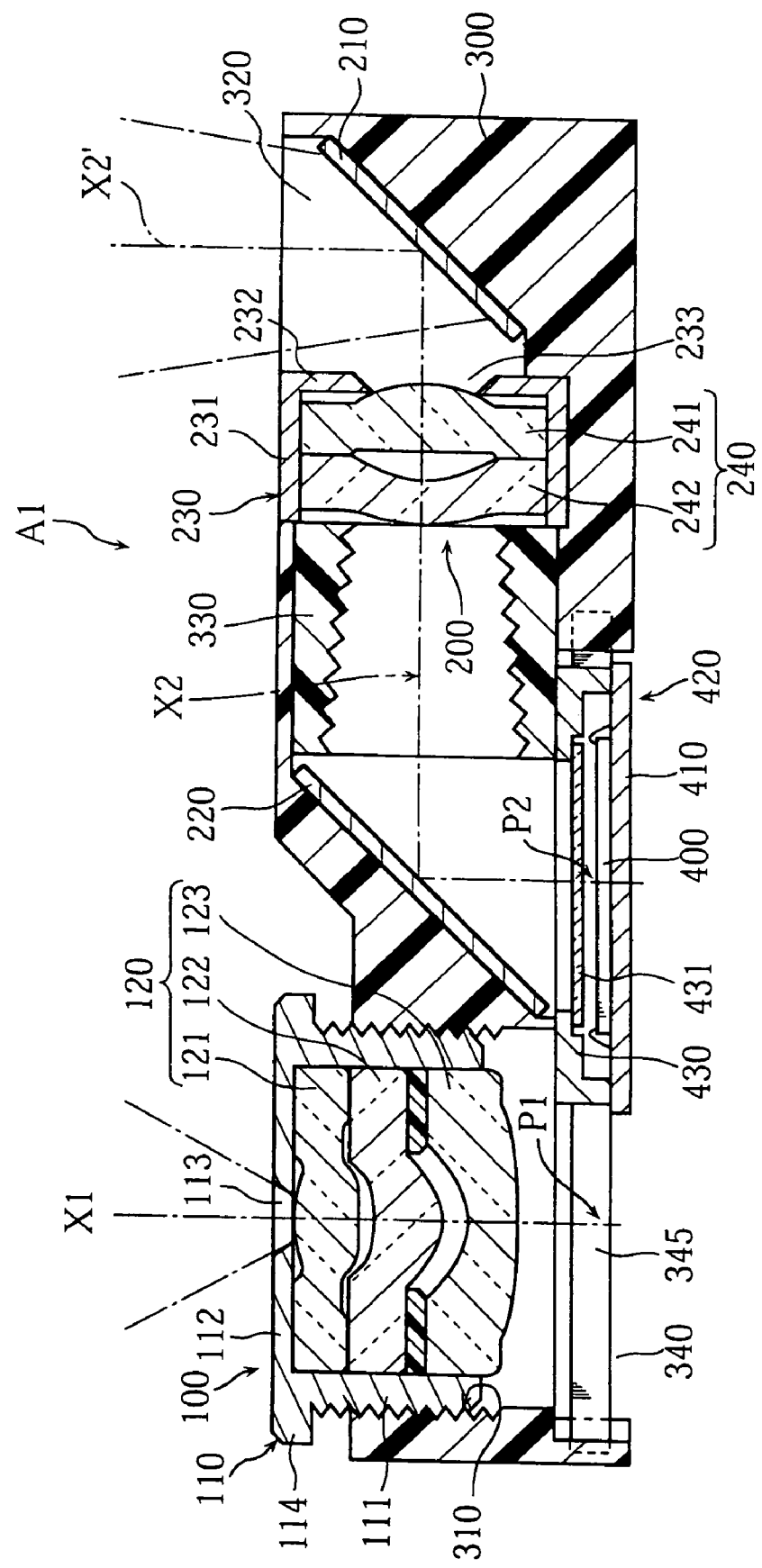
FIG. 4 is a cross-sectional view showing operation of the image sensor module shown in FIG. 1.

As shown in FIG. 4, by operating the operating mechanism 420, the image of the subject is formed on the image sensor chip 400 using the image-forming lens 200 when the image sensor chip 400 is positioned at the second position P2. Imaging in this case is in the telescopic imaging mode. Since the opening 233 has a greater diameter than the opening 113, the image quality in the telescopic imaging mode having a small view angle is not significantly darker than the image in the standard imaging mode. The light shield 330 prevents the portion of the light passing through the image-forming lens 240 and not required in forming the image of the subject (ambient light) from directly reaching the image sensor chip 400 without reflection by the second mirror 220. A high quality image in the telescopic imaging mode can therefore be maintained. Since (ambient light) is diffusely reflected by the inner surface of the light shield 330 due to the concave-convex sawtooth cross-section provided on the inner surface of the light shield 330, the amount of (ambient light) proceeding towards the image sensor chip 400 is reduced.

When the image sensor chip 400 is disposed at the first position P1, rotating the cap 110 moves the image-forming lens 120 in the direction away from the image sensor chip 400, and also realizes a close-up imaging mode.

Thus, according to the image sensor module A1, switching between the standard imaging mode, the telescopic imaging mode, and the close-up imaging mode can be readily achieved, and diversity in imaging modes provided. The image-forming lenses 120 and 240 are both comprised of a plurality of simple lenses fixed so that relative movement is impossible, and are of a simple structure in comparison to a telescopic lens, and thus cost can be reduced. Furthermore, the image-forming lenses 120 and 240 may also be designed to occupy a small volume.

In the second optical unit 200, the first and second mirrors 210 and 220 are used to increase the length of the light path by ensuring that the light proceeds in the longitudinal direction of the case 300. Thus, an increase in the thickness of the case 300 is also restricted. Furthermore, in the second optical unit 200, since light is reflected twice by the first and second mirrors 210 and 220, the image is not reversed left-right. The reduced thickness of the case 300, and the ability to realize the three imaging modes, ensure that the image sensor module A1 of the present embodiment is ideal for inclusion in small equipment such as mobile phone and the like.

In this image sensor module A1, the second position P2 is closer to the first position P1 than to the incident optical axis X2, of the second optical unit 200, and the first and second positions P1 and P2 are in close to each other. The stroke of the movement to move the image sensor chip 400 to the first and second positions P1 and P2 is therefore short, and the operating mechanism 420 can therefore be appropriately reduced in size, and operating precision can be improved. Furthermore, the speed with which standard imaging and telescopic imaging can be switched can also be increased. Since the image sensor chip 400 is moved to the first and second positions P1 and P2, only one image sensor chip 400 is required, and manufacturing costs are reduced in comparison to the case in which a plurality of image sensor chips are provided. Since the optical filter 431 moves together with the image sensor chip 400, only one optical filter 431 is required, and the number of components can be reduced.

FIG. 6 through FIG. 16 show other embodiments of the image sensor module according to the present invention. In the drawings in FIG. 6 and later, elements being the same or similar to those in the embodiment are labeled with the same symbol as in the embodiment.

Figure 6:
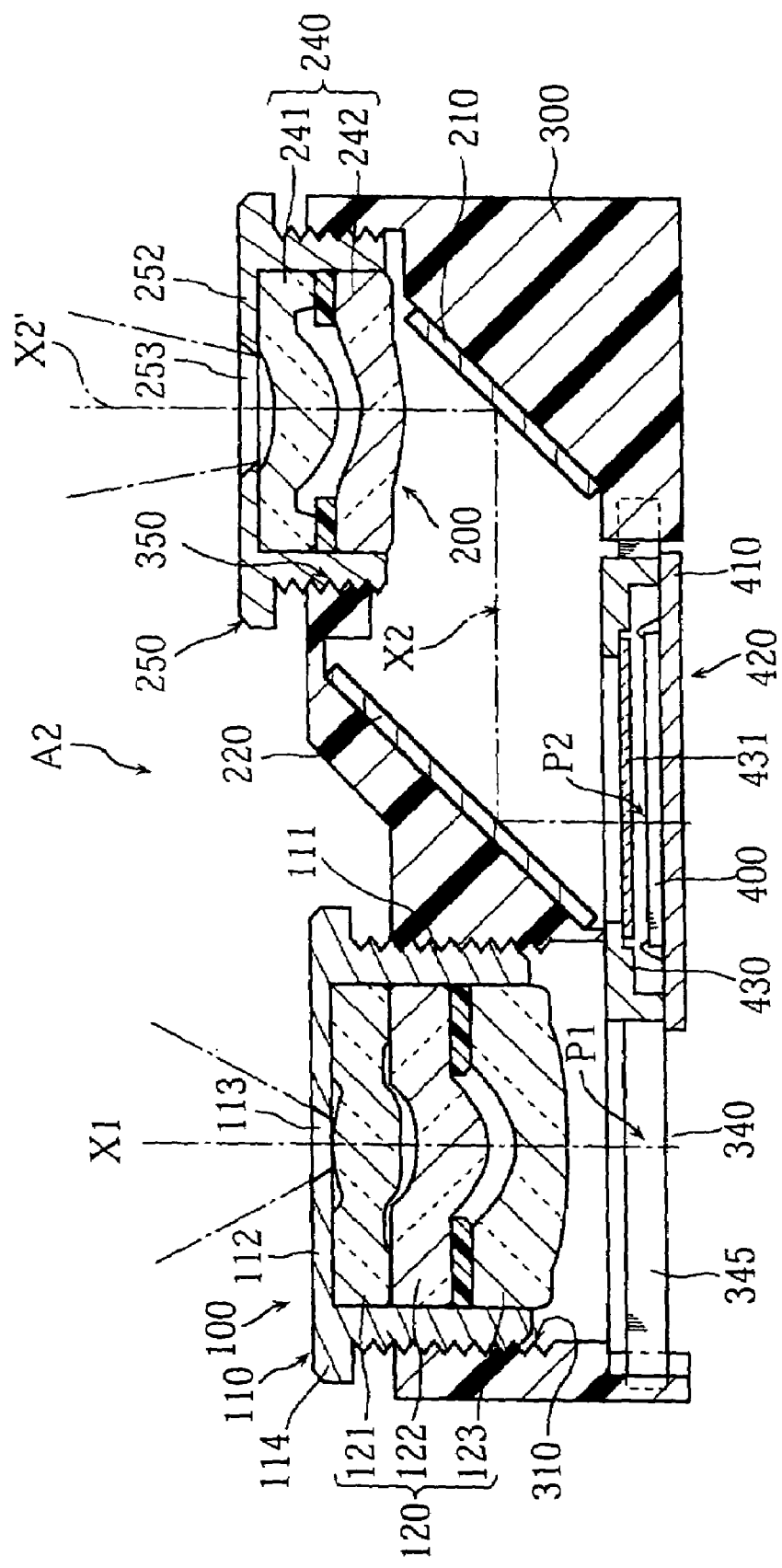
FIG. 6 is a cross-sectional view showing another embodiment of the image sensor module according to the present invention.

In the image sensor module A2 shown in FIG. 6, the image-forming lens 240 of the second optical unit 200 differs from the first embodiment. In practice, a threaded hole 350 is formed in the other end of the top wall of the case 300 in the longitudinal direction, and the image-forming lens 240 is held in a cap 250 screwed into this threaded hole 350. The image-forming lens 240 is positioned above the first mirror 210, and light passing through the image-forming lens 240 reaches the first mirror 210 and is then guided to the second position P2. The cap 250 has a similar structure to the cap 110, and the diameter of the opening 253 formed in the top wall 252 is greater than the opening 113 in the cap 110. Since the cap 250 is moved up and down by being rotated, the position of the image-forming lens 240 may be adjusted by moving the cap 250.

In the image sensor module A2, the length of the light path from the image-forming lens 240 to the second position P2 can be increased by the amount the image-forming lens 240 is positioned above the first mirror 210. Furthermore, by rotating the cap 250 to adjust the position of the image-forming lens 240, focusing in the telescopic imaging mode may be conducted appropriately.

Figure 7:
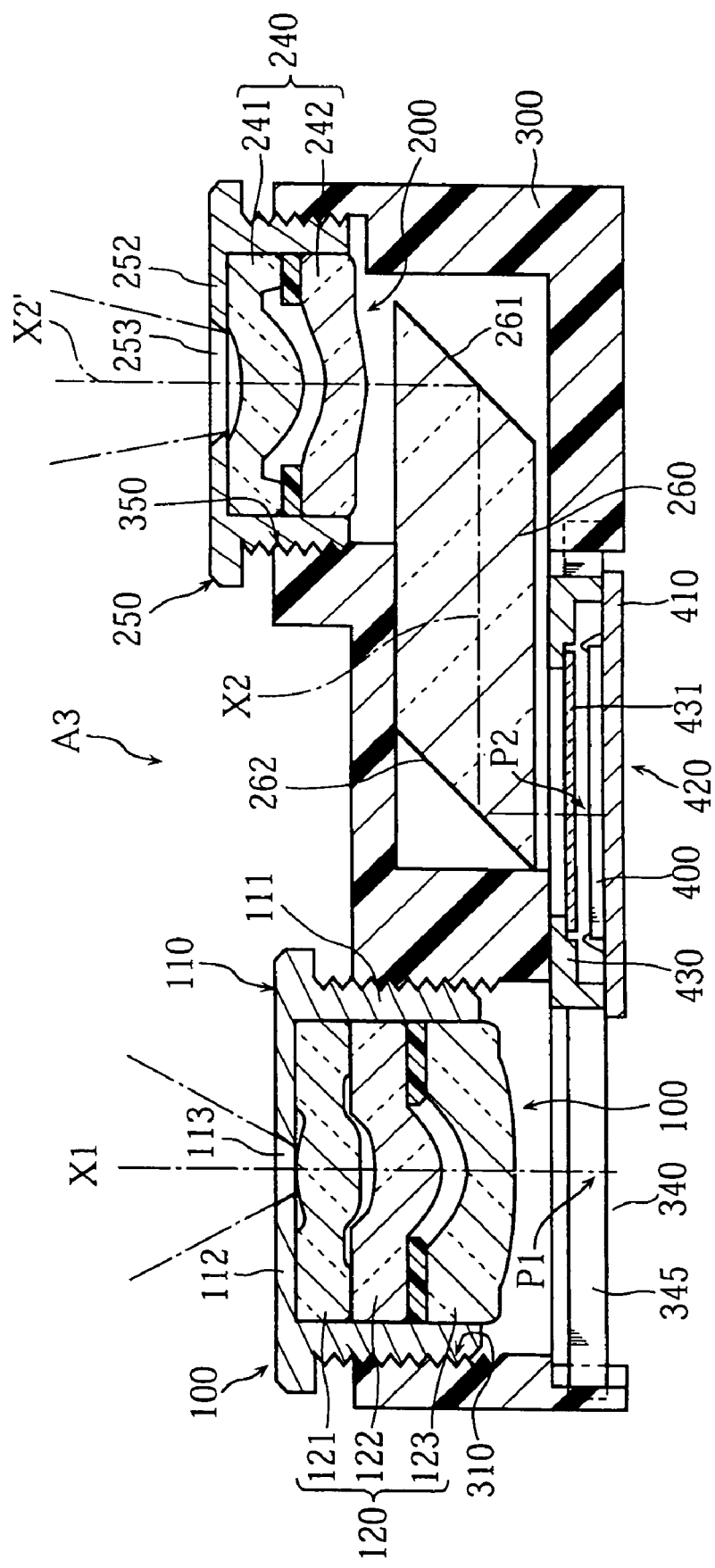
FIG. 7 is a cross-sectional view showing another embodiment of the image sensor module according to the present invention.

The image sensor module A3 shown in FIG. 7 has a structure wherein the second optical unit 200 has an optically transparent member 260. This optically transparent member 260 is manufactured of highly optically transparent polycarbonate or acrylic synthetic resin, with one end surface 261 positioned below the image-forming lens 240, and the other end surface 262 positioned above the second position P2, within the case 300. Both ends 261 and 262 are equivalent to practical examples of the first and second light-receiving surfaces of the present invention.

In the image sensor module A3, when the light from the subject passes through the image-forming lens 240, this light enters the optically transparent member 260 and is incident on the end surface 261. This light is then fully reflected by the end surface 261, and proceeds towards the end surface 262. Since the light is then fully reflected by the end surface 262, proceeds downwards, and reaches the second position P2, it is received by the image sensor chip 400. Thus, since a higher light reflectance ratio is obtained when full reflection is employed to guide the light than when mirrors are employed, light loss can be reduced. The present embodiment is therefore ideal for obtaining a brighter and clearer image. Furthermore, in the present embodiment, one optically transparent member 260 provides a similar function as the first and second mirrors 210 and 220 of the second embodiment, and the number of components is reduced in comparison with the case in which mirrors are employed. Simplification of the structure, and improved ease of manufacture, is therefore also possible.

Figure 8:
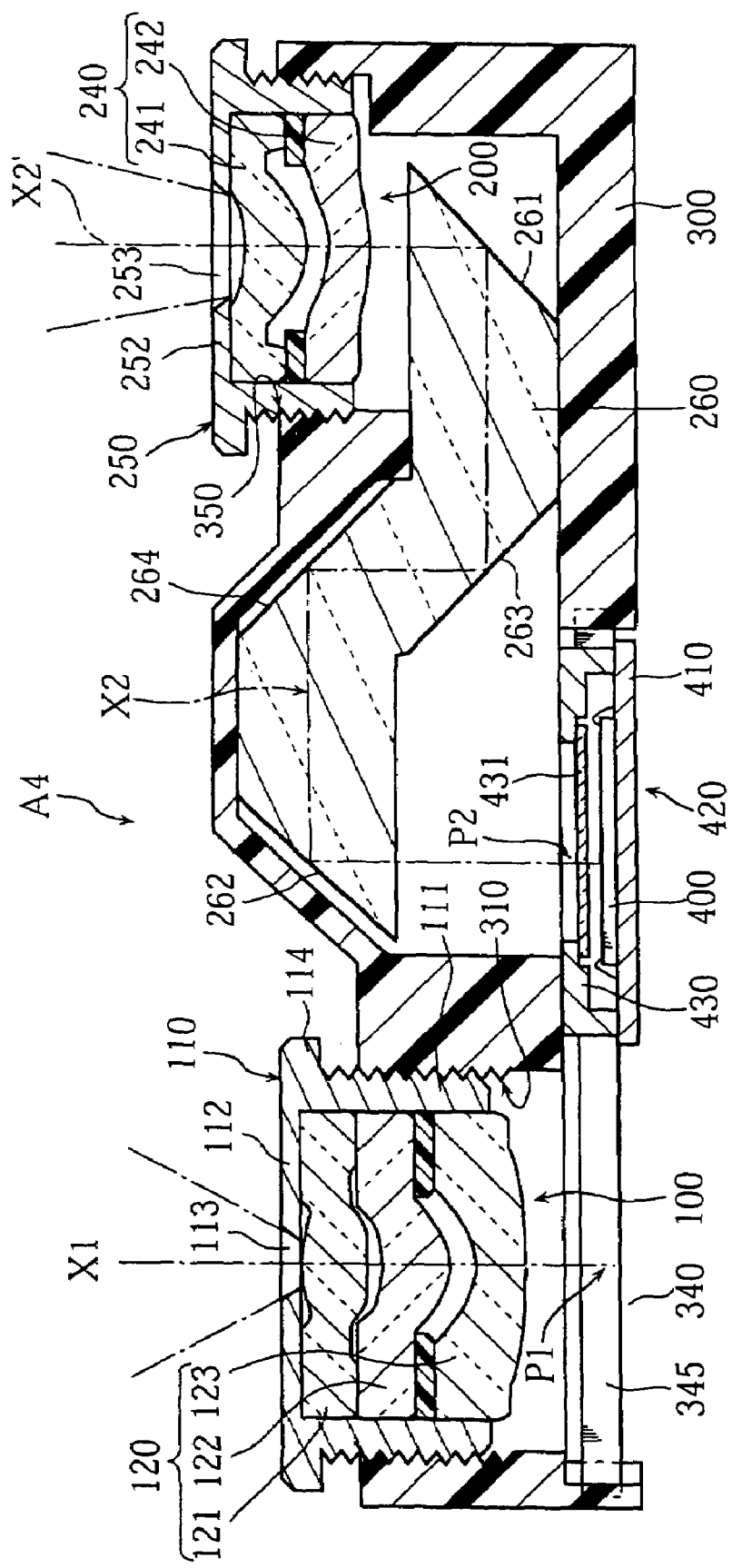
FIG. 8 is a cross-sectional view showing another embodiment of the image sensor module according to the present invention.

The structure of the image sensor module A4 shown in FIG. 8 is such that light is reflected four times by the optically transparent member 260. In practice, additional to the end surfaces 261 and 262, the optically transparent member 260 also has two inclined surfaces 263 and 264. The light passing through the image-forming lens 240 is reflected in sequence by the end surface 261 and the inclined surfaces 263 and 264, and reaches the end surface 262, and is reflected by this end surface 262 towards the second position P2.

This structure is ideal since the length of the light path from the image-forming lens 240 to the second position P2, and magnification of the telescopic image, are increased. Furthermore, as described above, when the optically transparent member 260 is employed for full reflection of the light, since the reflectance ratio is high, the image does not become dark even when the number of times the light is reflected is increased. Furthermore, the light is reflected four times by the single optically transparent member 260, and the number of components is therefore less than when the light is reflected using four mirrors.

Figure 9:
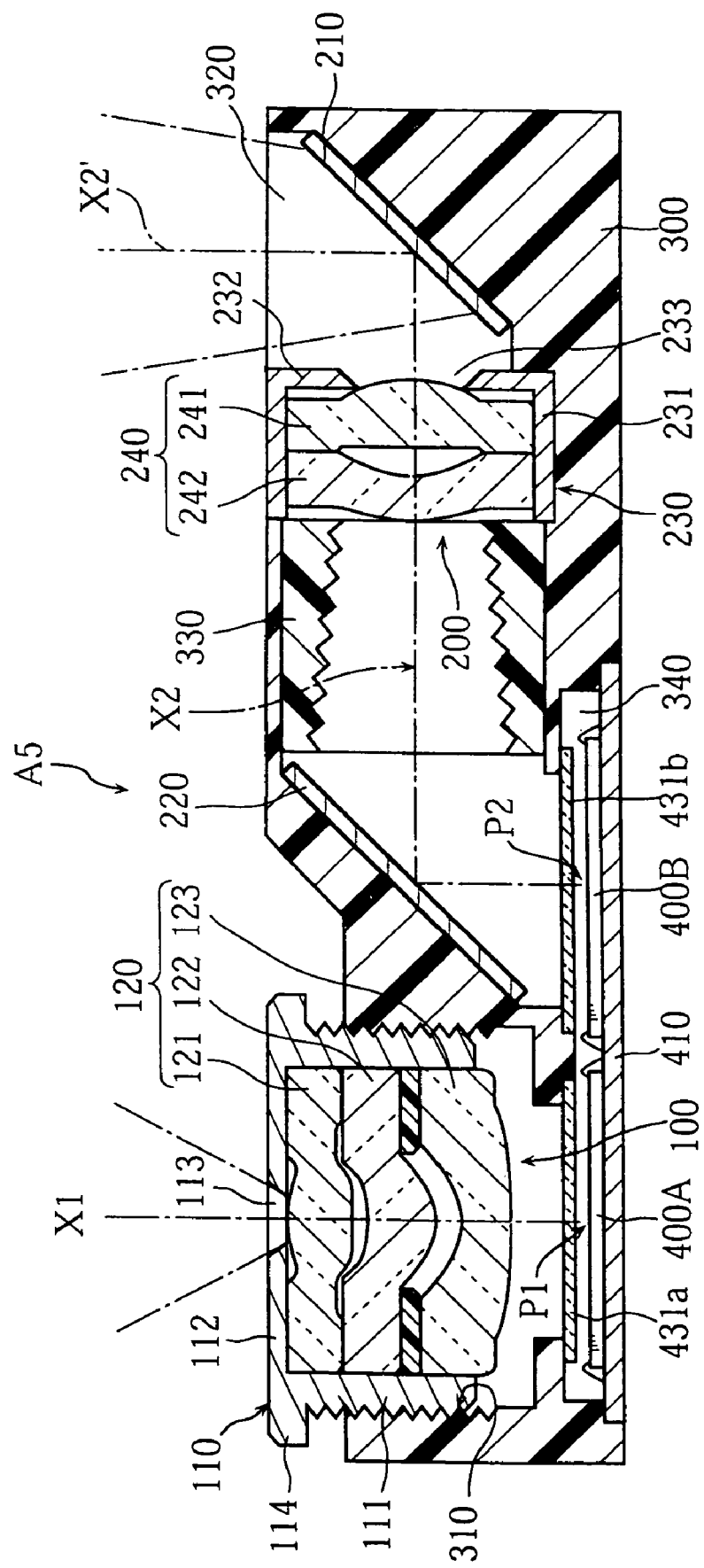
FIG. 9 is a cross-sectional view showing another embodiment of the image sensor module according to the present invention.

The image sensor module A5 shown in FIG. 9 has first and second image sensor chips 400A and 400B. The first and second image sensor chips 400A and 400B are mounted beside each other on the substrate 410 incorporated in the bottom of the case 300, the first image sensor chip 400A being fixed at the first position P1, and the second image sensor chip 400B being fixed at the second position P2. The optical filters 431a and 431b supported on the case 300 are positioned above the first and second image sensor chips 400A and 400B.

According to this structure, the imaging mode can be selected by switching between the first and second image sensor chips 400A and 400B on-off. When the first image sensor chip 400A is switched on, and the second image sensor chip 400B is switched off, the image is obtained with the standard imaging mode using the first optical unit 100. On the other hand, when the first image sensor chip 400A is switched off, and the second image sensor chip 400B is switched on, the image is obtained with the telescopic imaging mode using the second optical unit 200. Since the imaging mode is selected by electrical on-off switching, the mode can be rapidly selected. However, when the first and second image sensor chips 400A and 400B are both on, a method of use whereby two types of image signals are output, and only one is selected, may also be employed. Since this image sensor module A5 requires no dynamic mechanism to switch the imaging mode, it has the advantage that the possibility of mechanical failure is reduced. In FIG. 9, the second optical unit 200 has a similar structure to the image sensor module A1 shown in FIG. 1 through FIG. 4, however it can have a similar structure to the image sensor modules A2 through A4 shown in FIG. 6 through FIG. 8.

Figure 10:
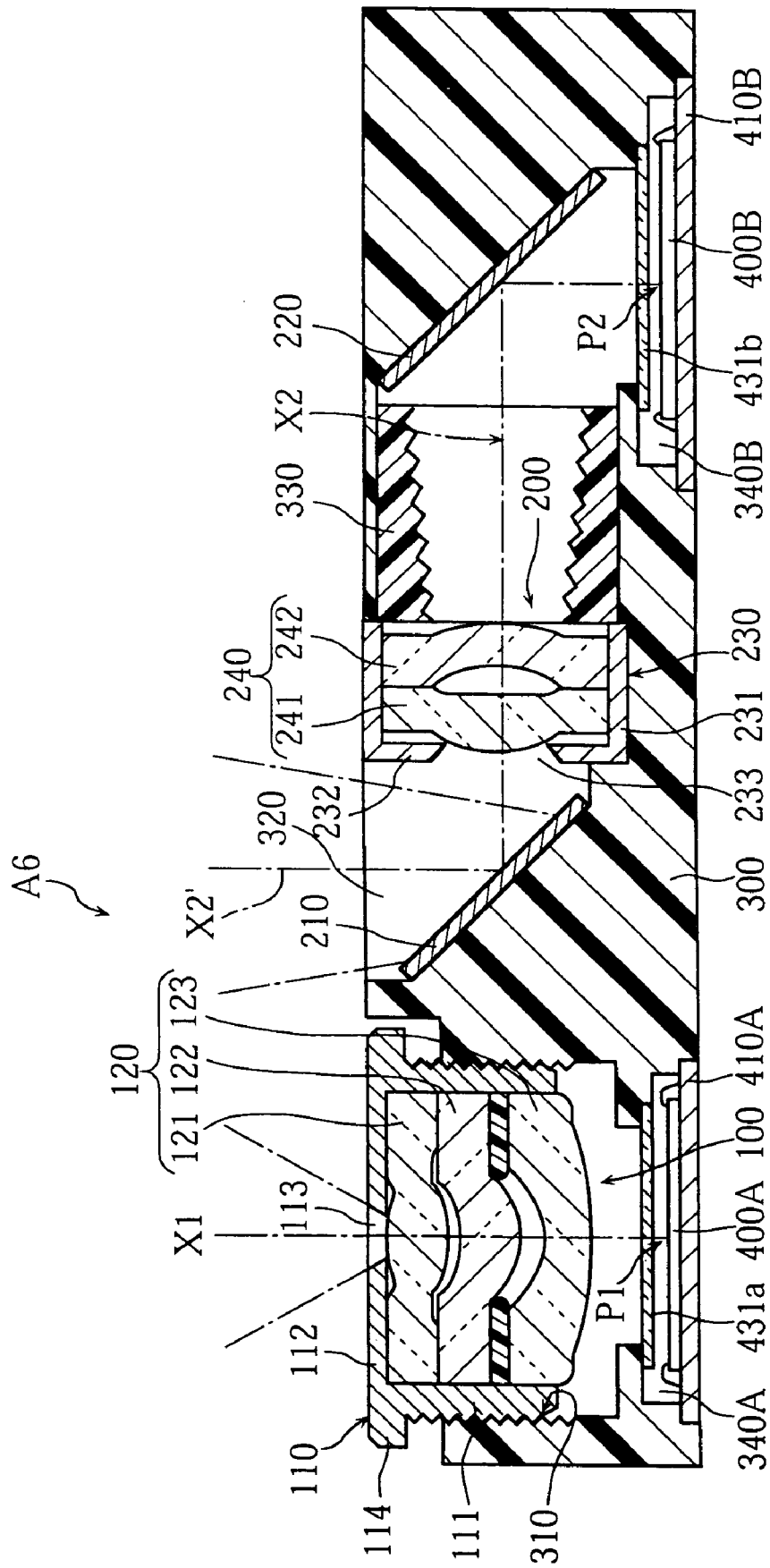
FIG. 10 is a cross-sectional view showing another embodiment of the image sensor module according to the present invention.

The structure of the image sensor module A6 shown in FIG. 10 is such that the incident optical axis X2' of the second optical unit 200 is positioned closer to the first position P1 than to the second position P2. In practice, the opening 320 and the first mirror 210 are provided closer to the first optical unit 100 than to the second mirror 220, and light proceeding from the opening 320 into the case 300 then proceeds in the direction opposite to the first optical unit 100 due to the first mirror 210, and is then reflected downwards by the second mirror 220, and thus reaches the second position P2. While the first image sensor chip 400A is mounted on the substrate 410A and positioned at the first position P1, the second image sensor chip 400B is mounted on the substrate 410B and positioned at the second position P2.

The structure of this image sensor module A6 is such that the incident optical axis X2' of the second optical unit 200 is close to the optical axis X1 of the first optical unit 100. Parallax error is therefore reduced when the first and second optical units 100 and 200 are each used for imaging of the subject. The distance between the first and second positions P1 and P2 becomes comparatively large, and since the first and second image sensor chips 400A and 400B are fixed at the first and second positions P1 and P2, no particular problems are encountered. When one image sensor chip is reciprocated between the first and second positions P1 and P2 in a manner differing from the present embodiment, an increase in this reciprocating distance results in a large and complex operating mechanism, and there is the possibility that the time required for movement of the image sensor chip may increase. In contrast, since the first and second image sensor chips 400A and 400B are fixed in the present embodiment, this problem does not arise. However, the present invention adopt a structure wherein the first and second optical units 100 and 200 is designed as shown in FIG. 10, and a single image sensor chip is able to reciprocate between the first and second positions P1 and P2.

Figure 11:
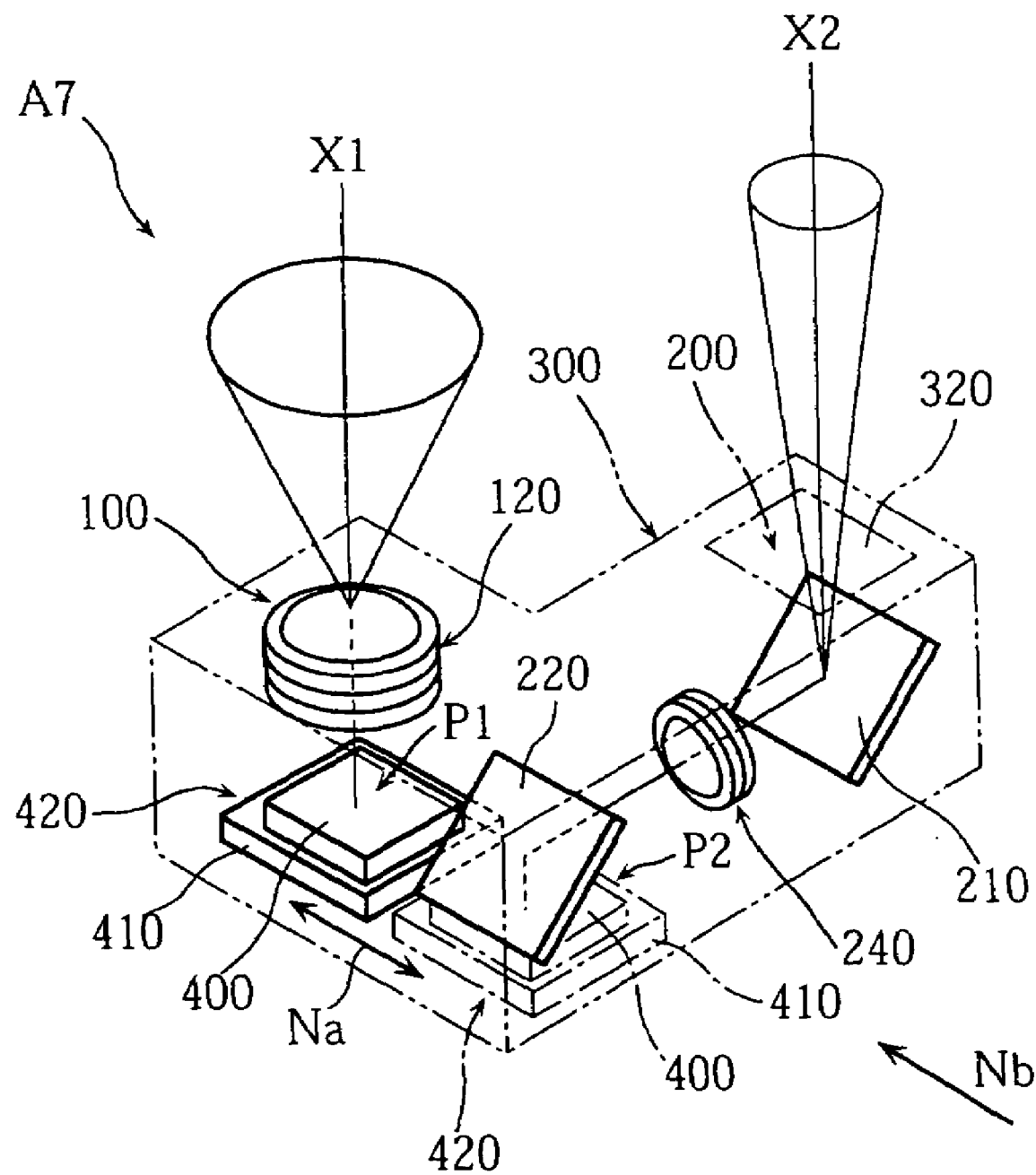
FIG. 11 is a perspective view showing the outline of another embodiment of the image sensor module according to the present invention.

The image sensor module A7 shown in FIG. 11 has an L-shaped case 300 in plan view. The first optical unit 100 having a image-forming lens 120 is provided at one end of the case 300, and the second optical unit 200 is provided in the remainder of the case. By providing the opening 320 and first mirror 210 of the second optical unit 200 at the other end of the case 300, the second mirror 220 receiving light passing through the image-forming lens 240, and the second position P2, are close to the first optical unit 100. As shown by the solid lines and phantom lines, the image sensor chip 400 can be switched between the state wherein it is at the first position P1 on the optical axis X1, and the state wherein it is at the second position P2, and can be reciprocated in the direction of the arrow Na while mounted on the substrate 410.

This image sensor module A7 does not have the first and second optical units 100 and 200 arrayed in a straight line, and the first optical unit 100 and second optical unit 200 overlap when viewed from the arrow Nb in FIG. 11. Thus, an increase in the overall length of this image sensor module A7 can be restricted.

Thus, in the present invention, the first and second optical units are provided overlapping and in parallel as means of restricting an increase in the overall length of the image sensor module. In this case, two image sensor chips may of course be fixed at the first and second positions, as opposed to the structure wherein the image sensor chip is reciprocated between the first and second positions.

Figure 12:
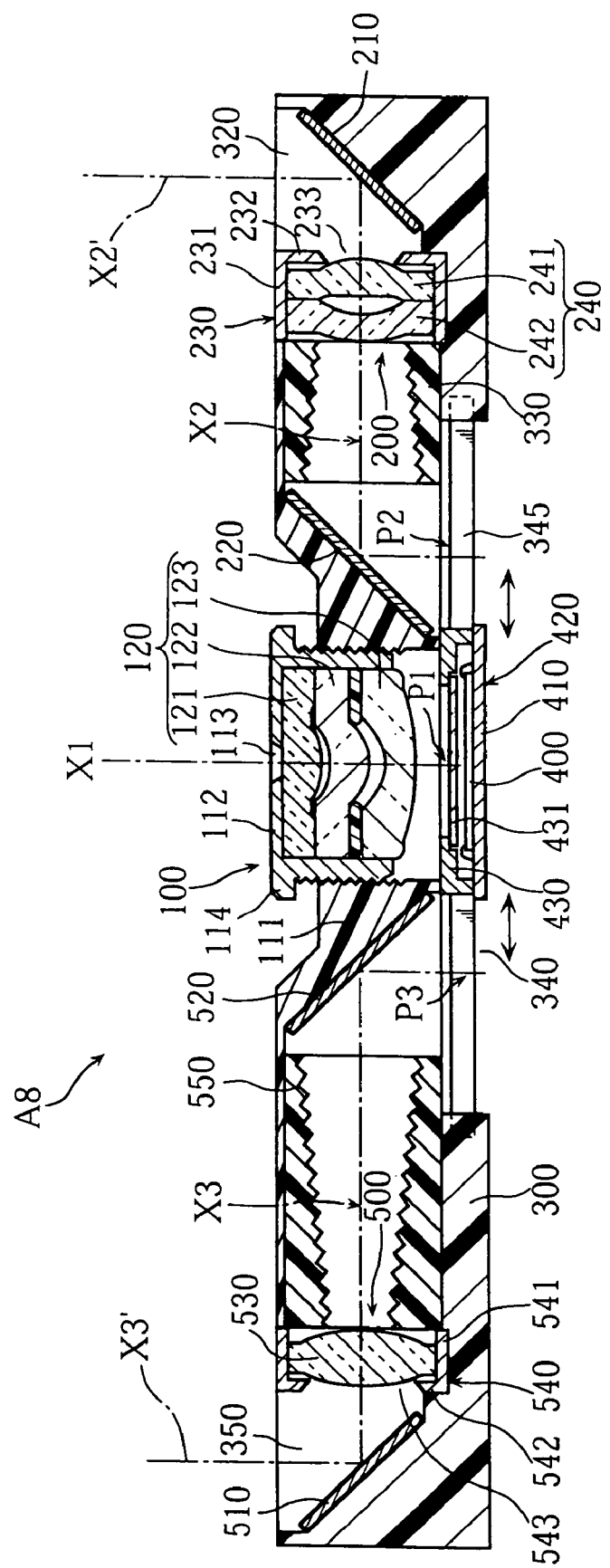
FIG. 12 is a cross-sectional view showing another embodiment of the image sensor module according to the present invention.
Figure 13:
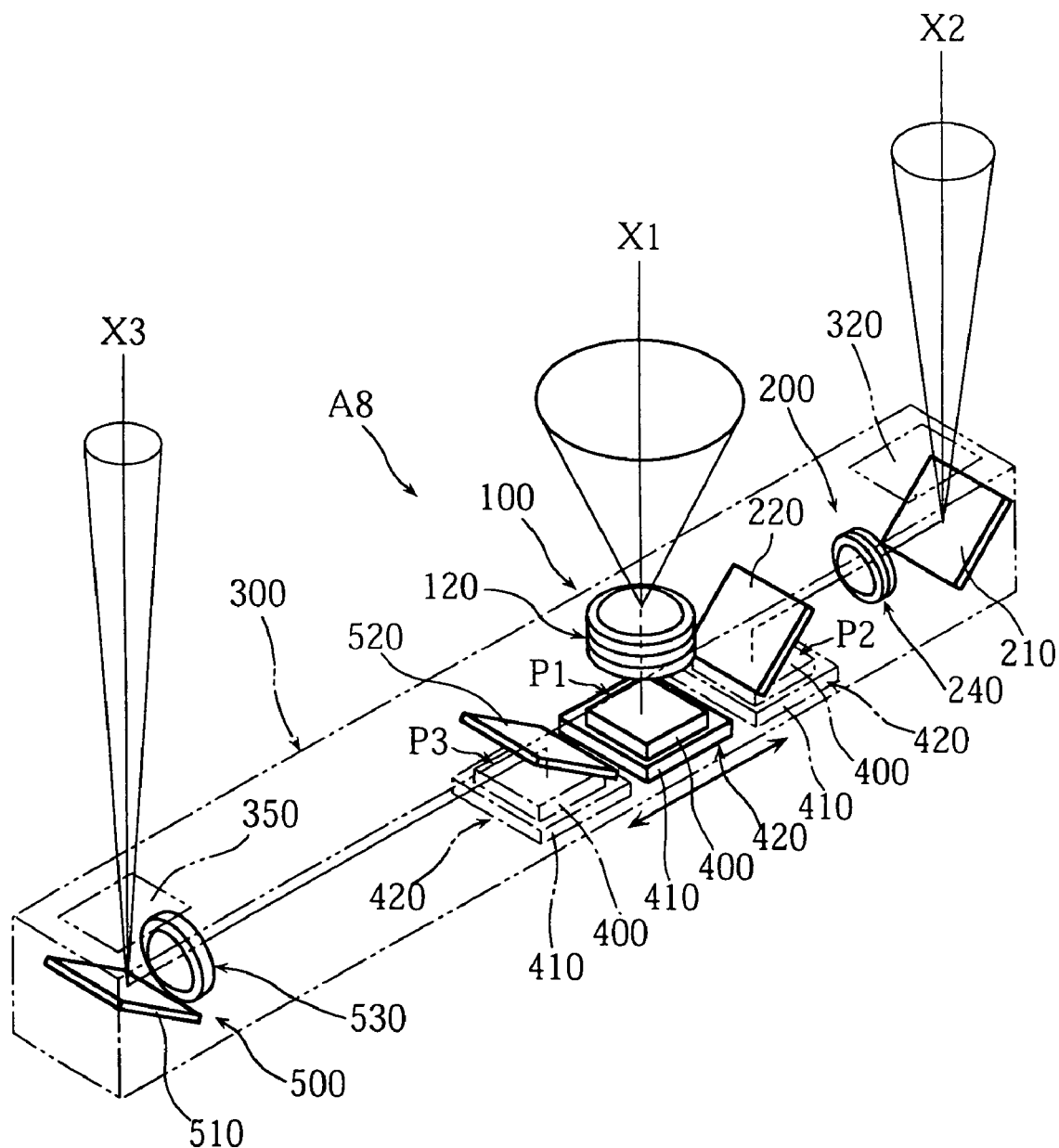
FIG. 13 is a perspective view showing the outline of the image sensor module shown in FIG. 12.

The image sensor module A8 shown in FIG. 12 and FIG. 13 has a structure wherein a third optical unit 500 is provided in addition to the first and second optical units 100 and 200. In practice, the case 300 is of long rectangular shape in plan view, with the first optical unit 100 having the image-forming lens 120 provided midway along its length. The second optical unit 200 having the image-forming lens 240 and first and second mirrors 210 and 220 is provided on one side of this first optical unit 100. The second optical unit 200 is configured such that the second position P2 is closer to the first optical unit 100 than to the incident optical axis X2'. The third optical unit 500 is provided in the opposite area to the second optical unit 200, separated by the first optical unit 100. The basic structure of the third optical unit 500 is in common with the second optical unit 200, and for example, has a first mirror 510 reflecting light proceeding downwards from the opening 350 provided in the case 300 towards the middle of the case 300 in the longitudinal direction, an image-forming lens 530 focusing light reflected by the first mirror 510, and a second mirror 520 reflecting downwards light having passed through the image-forming lens 530. The bottom of the second mirror 520 on the optical axis X3 of the third optical unit 500 is the third position P3 for positioning the image sensor chip 400. This third position P3 is the image-formation point in the third optical unit 500, and is positioned closer to the first optical unit 100 than to the incident optical axis X3'.

The distance between the first and second mirrors 510 and 520 is greater than the distance between the second optical unit 200 and the first and second mirrors 210 and 220. Thus, in the third optical unit 500, the length of the light path from the image-forming lens 530 to the third position P3 is greater than this distance in the first and second optical units 100 and 200. The imaging mode using the third optical unit 500 is therefore a telescopic imaging mode having a higher magnification then when the second optical unit 200 is used. The third optical unit 500 is provided with a lens holder 540 and a light shield 550 having a similar function to the lens holder 230 and light shield 330 of the second optical unit 200. The diameter of the opening 543 of the lens holder 540 is greater than the diameter of the openings 113 and 233 of the first and second optical units 100 and 200, and the problem of an insufficient amount of light does not occur due to the narrower view angle. The image sensor chip 400 is movable so that it can be positioned at the first and second positions P1 and P2, as well as at the third position P3, by operation of the operating mechanism 420.

In the image sensor module A8, by positioning the image sensor chip 400 at any of the first through third positions P1 through P3, the imaging mode can be switched to select the standard imaging mode, the telescopic imaging mode, or the telescopic imaging mode with higher magnification. The diversity of imaging modes is therefore increased.

Thus, a structure having a separate optical unit in addition to the first and second optical units may be provided in the present invention. In this case, of course, a plurality of image sensor chips may be fixedly provided at a plurality of prescribed positions, instead of using a single movable image sensor chip. In practice, when a third optical unit is additionally provided, a third image sensor chip provided separately from the first and second image sensor chips may be fixed at the image-formation point of the third optical unit.

Figure 14:
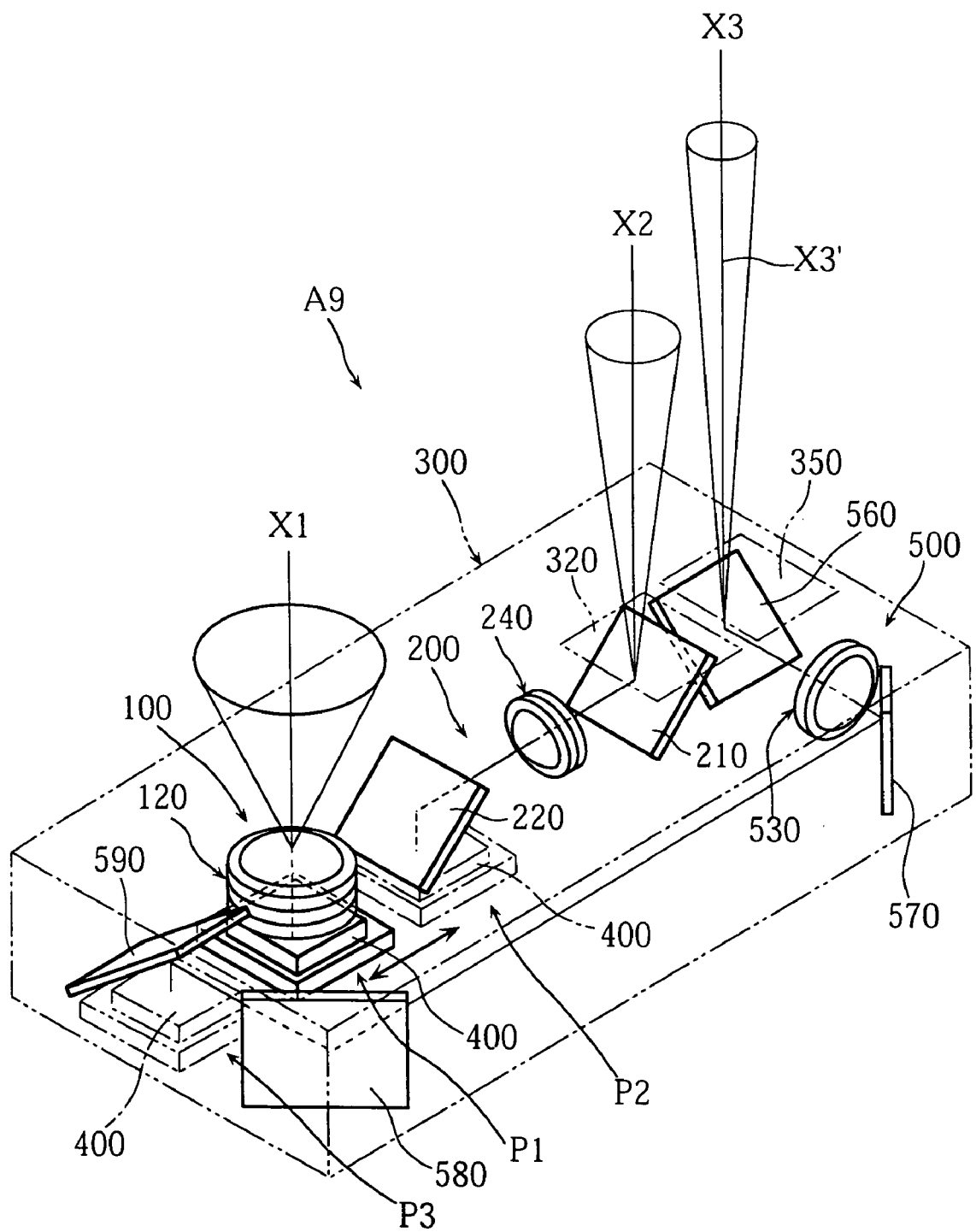
FIG. 14 is a perspective view showing the outline of another embodiment of the image sensor module according to the present invention.

The image sensor module A9 shown in FIG. 14 has a structure wherein the third optical unit 500 is provided in parallel to the first and second optical units 100 and 200. In practice, the image sensor module A9 has a structure wherein the first and second optical units 100 and 200 are provided in the longitudinal direction of the case 300. The third optical unit 500 is configured such that light proceeding from the opening 350 formed towards one end of the case 300 beyond the opening 320 and into the case 300 is guided to the third position P3, the light proceeding from the opening 350 into the case 300 is reflected in the crosswise direction of the case 300 by the first mirror 560, passed through the image-forming lens 530, and reflected towards the other end in the longitudinal direction of the case 300 by the intermediate mirror 570. By subsequently reflecting this light in the crosswise direction of the case 300 with the intermediate mirror 580, it proceeds towards the second mirror 590 and is then reflected downwards by the second mirror 590, and is thus guided to the third position P3. The positional relationship between the first through third positions P1 through P3 is similar to that of the image sensor module A8 shown in FIG. 12 and FIG. 13, and the image sensor chip 400 may be moved relative to any of these positions P1 through P3.

In the image sensor module A9, the length of the light path from the image-forming lens 530 to the third position P3 may be longer than the length of the light path from the image-forming lens 240 to the second position P2. As with the image sensor module A8 shown in FIG. 12 and FIG. 13, the third optical unit 500 may be used for telescopic imaging with a higher magnification than the second optical unit 200. The light path between the intermediate mirrors 570 and 580 of the third optical unit 500 is parallel to the light paths of the first and second optical units 100 and 200, and overlaps in the longitudinal direction of the case 300. An increase in the overall length of the case 300 may there fore be suitably restricted.

Figure 15:
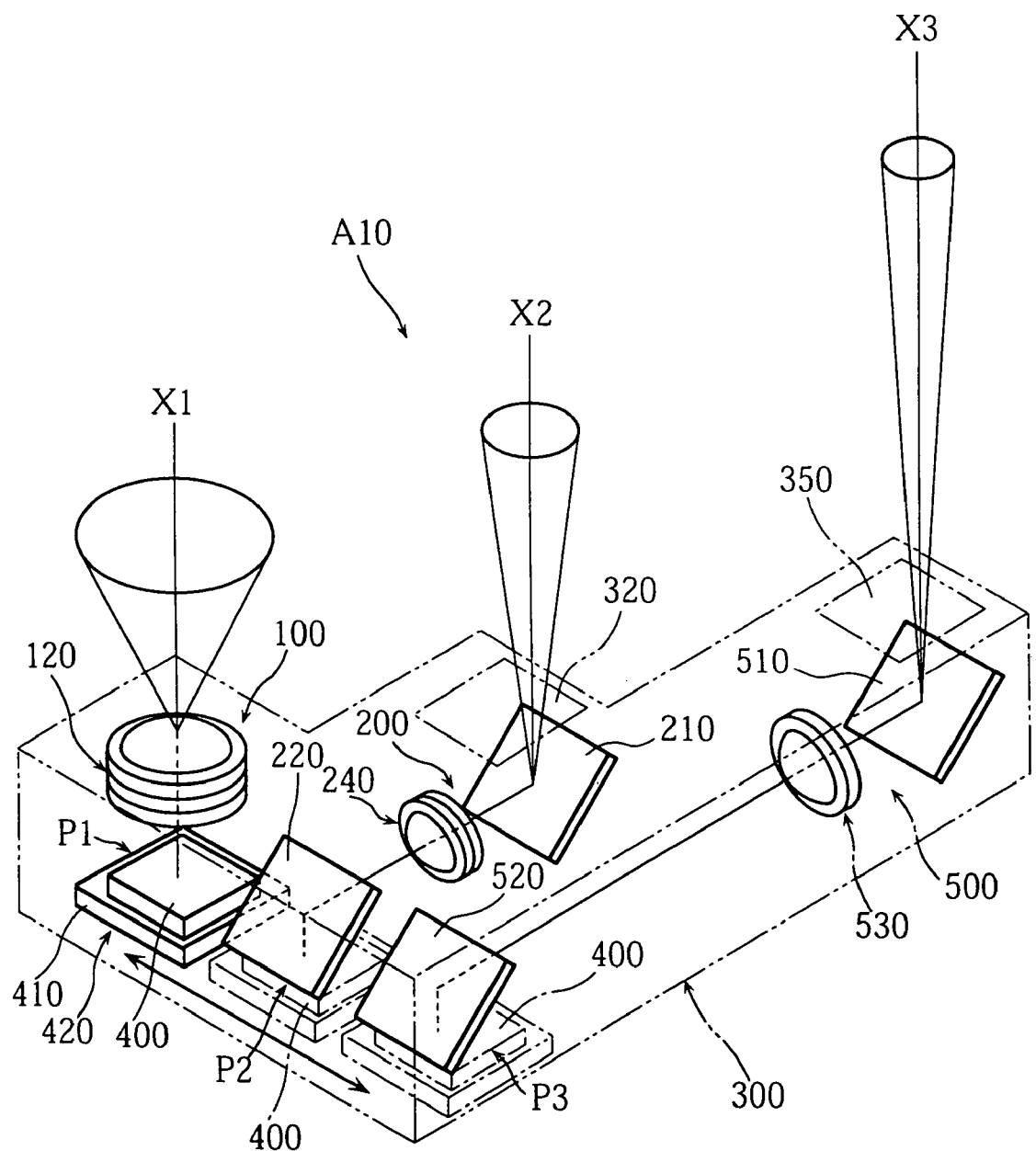
FIG. 15 is a perspective view showing the outline of another embodiment of the image sensor module according to the present invention.

In the image sensor module A10 shown in FIG. 15, the first through third optical units 100, 200, and 500 are provided in parallel. In practice, the first and second optical units 100 and 200 have a similar structure to the image sensor module A7 shown in FIG. 11. The third optical unit 500 has a structure wherein the light path between the first and second mirrors 510 and 520 is formed parallel to the light path between the first and second mirrors 210 and 220 of the second optical unit 200. The second mirror 520 is adjacent to the second mirror 220, and the first through third positions P1 through P3 are arranged in a straight line.

With this structure as well, the length of the light path from the image-forming lens 530 of the third optical unit 500 to the third position P3 may be longer than the length of the light path from the image-forming lens 240 of the second optical unit 200 to the second position P2, and the third optical unit 500 may be used for telescopic imaging with a higher magnification than the second optical unit 200. Since the light path of the third optical unit 500 is parallel to the light paths of the first and second optical units 100 and 200, an increase in the overall length of the image sensor module A10 may be appropriately restricted.

The image sensor modules A11 and A12 shown in FIG. 16A and FIG. 16B have a structure equivalent to the separation of the image sensor module A5 shown in FIG. 9 and the image sensor module A6 shown in FIG. 10 into a first optical unit 100 part and a second optical unit 200 part. The image sensor module A11 has an optical unit 100 for use with the standard imaging mode. The case 300A of this image sensor module A11 is formed in a size necessary and sufficient for attachment of a cap 110 holding the image-forming lens 120, and fitting of the substrate 410A on which the image sensor chip 400A is mounted. The image sensor module A12 has an optical unit 200 for use with the telescopic imaging mode, and the case 300B is formed in a size necessary and, sufficient for attachment of the prescribed components comprising the optical unit 200.

If these two image sensor modules A11 and A12 are used in combination, similar functions are obtained as with the image sensor modules A5 and A6 shown in FIG. 9 and FIG. 10. Furthermore, since the two image sensor modules A11 and A12 can also be mutually separated in use, when used in, for example, a mobile phone, they are less subject to restrictions of space, and two image sensor modules A11 and A12 can be fitted with considerable flexibility, ensuring convenience.

As with the second optical unit 200 of the image sensor modules A12 of the embodiments, since the light path extending in the longitudinal direction of the case 300B is formed by using the first and second mirrors 210 and 220 as means to increase the length of the light path from the image-forming lens 240 to the image sensor chip 400B, an increase in the thickness of the case 300B can be appropriately restricted. This is beneficial when incorporated in small spaces such as in thin mobile phones. Such effects can, naturally, be obtained when using the optically transparent member 260 shown in FIG. 7 in place of the first and second mirrors 210 and 220, and a structure employing the optically transparent member 260 can also be employed in the image sensor module A12 of the present embodiment. In the final part of the light path of the optical unit 200, the light is reflected downwards by the second mirror 220, and since the light-receiving surface of the image sensor chip 400B is provided facing upwards, even when an image sensor chip 400B having a large light-receiving surface is employed, the overall thickness of the image sensor module A12 does not become large. While the image sensor module A12 is thin, an image sensor chip 400B having a large number of light-receiving pixels, and a light-receiving surface of large area, may be employed, and it is therefore ideal for high-quality imaging.

The present invention is not limited to the embodiments. The practical structure of the components of the image sensor module according to the present invention may be changed in design.

A variety of means may be employed for making the image sensor chip movable. In place of manual operation as means of adjusting the position of the image-forming lens on the optical axis, a piezoelectric actuator such as a bimorph or monomorph-type piezoelectric actuator and the like, or another type of actuator, may be used. However, the image-forming lens may also be fixed in one position, without being freely adjustable. Furthermore, the image-forming lens may be either a simple lens or a compound lens, and the actual number of simple lenses comprising the compound lens is not limited.

The first and second optical units need not be designed for standard imaging and telescopic imaging, and can be configured, for example, as two types for standard imaging, two types for telescopic imaging, or as two types for wide-angle imaging, with differing angles of view and magnification. Furthermore, a structure for wide-angle imaging and standard imaging is also possible.

The invention claimed is:

1. An image sensor module comprising:
   a case;
   a photoelectric converter positioned within the case and having a light receiving surface;
   a first optical unit provided within the case and forming an image of a subject on the light receiving surface of the photoelectric converter, the first optical unit providing a first light path; and
   a second optical unit provided within the case and forming an image of the subject on the light receiving surface of the photoelectric converter, the second optical unit providing a second light path different from the first light path, the second optical unit being optically separate from the first optical unit for preventing light passing along the second light path from passing along the first light path, wherein switching is possible between imaging of the subject using the first optical unit and imaging of the subject using the second optical unit;

wherein the first and second optical units include a first lens unit and a second lens unit, respectively, the second light path from the second lens unit to a second position where the image of the subject is formed is longer than the first light path from the first lens unit to a first position where the image of the subject is formed; and wherein the photoelectric converter comprises an image sensor chip, and the image sensor chip is movable to the first and second positions.

2. An image sensor module according to claim 1, wherein the first optical unit is employed for standard imaging, and the second optical unit is employed for standard imaging with a narrower view angle during imaging than the first optical unit, or for telescopic imaging.

3. An image sensor module according to claim 1, further comprising a substrate on which the image sensor chip is mounted, and an operating mechanism for moving the substrate relative to the case to bring the image sensor chip to the first and second positions.

4. An image sensor module according to claim 3, wherein the operating mechanism includes a cover attached to the substrate and enclosing the image sensor chip, and a guide provided on the case for slidably guiding the cover.

5. An image sensor module according to claim 1 further comprising an optical filter passing only light of a specific wavelength range proceeding to the image sensor chip, wherein the optical filter is movable together with the image sensor chip.

6. An image sensor module according to claim 1, wherein the first optical unit has an optical axis extending linearly through the first lens unit to the first position, and the second optical unit has a bent optical axis extending through the second lens unit to the second position.

7. An image sensor module according to claim 6, wherein the second optical unit includes light-reflecting means for reflecting light an even number of times.

8. An image sensor module, comprising:
a case;
a photoelectric converter positioned within the case and having a light receiving surface;
a first optical unit provided within the case and forming an image of a subject on the light receiving surface of the photoelectric converter, the first optical unit providing a first light path; and
a second optical unit provided within the case and forming an image of the subject on the light receiving surface of the photoelectric converter, the second optical unit providing a second light path different from the first light path, the second optical unit being optically separate from the first optical unit for preventing light passing along the second light path from passing along the first light path, wherein switching is possible between imaging of the subject using the first optical unit and imaging of the subject using the second optical unit;

wherein the first and second optical units include a first lens unit and a second lens unit, respectively, the second light path from the second lens unit to a second position where the image of the subject is formed is longer than the first light path from the first lens unit to a first position where the image of the subject is formed;

wherein the first optical unit has an optical axis extending linearly through the first lens unit to the first position, and the second optical unit has a bent optical axis extending through the second lens unit to the second position;

wherein the second optical unit includes light-reflecting means for reflecting light an even number of times; and wherein the light reflecting means has a first light reflecting surface for causing light proceeding in a first direction from a front side of the subject towards the case to be reflected in a second direction intersecting the first direction, and a second light reflecting surface for causing light from the first light receiving surface to be reflected in the first direction towards the second position.

9. An image sensor module according to claim 8, wherein the light-reflecting means includes a transparent member having a plurality of surfaces, two of the plurality of surfaces serving as the first and second light reflecting surfaces, the first and second light reflecting surfaces providing total reflection of light proceeding from the subject.

10. An image sensor module according to claim 8, wherein the light-reflecting means includes a plurality or mirrors.

11. An image sensor module according to claim 8, wherein the first and second optical units mutually overlap in the second direction.

12. An image sensor module according to claim 1, wherein the second lens unit has fewer lenses than the first lens unit.

13. An image sensor module according to claim 1, wherein each of the first and second optical units has a light incident side provided with an aperture, and the aperture of the second optical unit has a larger opening than that of the first optical unit.

14. An image sensor module according to claim 1, wherein at least one of the first and second lens units is positionally adjustable in the optical axis direction.

15. An image sensor module according to claim 1, wherein the second position is closer to the first position than it is to an incident optical axis of the second optical unit.

16. An image sensor module according to claim 1, wherein an incident optical axis of the second optical unit is closer to the first position than it is to the second position.

17. An image sensor module according to claim 1, further comprising a third optical unit provided in the case and having a third optical path different from the first and second optical paths for forming an image of the subject on the light receiving surface of the photoelectric converter, wherein switching to imaging of the subject using the third optical unit is possible in addition to imaging of the subject using the first and second optical units.

18. An image sensor module according to claim 17, wherein the photoelectric converter comprises an image sensor chip, and the image sensor chip is movable to positions where images of the subject are formed in the first through third optical units.

19. An image sensor module according to claim 17, wherein the photoelectric converter comprises first through third image sensor chips provided in corresponding relationship to the first through third optical units.

* * * * *